US012142223B2

(12) United States Patent
Lee et al.

(10) Patent No.: US 12,142,223 B2

(45) **Date of Patent: *Nov. 12, 2024**

(54) DISPLAY DEVICE

(71) Applicant: LG Display Co., Ltd., Seoul (KR)

(72) Inventors: Wonsuk Lee, Paju-si (KR); Joonmo Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,523

(22) Filed: Jul. 21, 2023

(65) Prior Publication Data

US 2023/0360606 A1 Nov. 9, 2023

Related U.S. Application Data

(63) Continuation of application No. 17/890,190, filed on Aug. 17, 2022, now Pat. No. 11,741,900, which is a continuation of application No. 17/136,977, filed on Dec. 29, 2020, now Pat. No. 11,450,279.

(30) Foreign Application Priority Data

Dec. 31, 2019 (KR) ........................ 10-2019-0179738

(51) Int. Cl.

*G09G 3/3258* (2016.01)
*G09G 3/3233* (2016.01)
*G09G 3/3291* (2016.01)

(52) U.S. Cl.

CPC ......... *G09G 3/3258* (2013.01); *G09G 3/3291* (2013.01); *G09G 3/3233* (2013.01); *G09G 2310/0297* (2013.01); *G09G 2320/0673* (2013.01)

(58) Field of Classification Search

CPC .. G09G 3/3258; G09G 3/3291; G09G 3/3233; G09G 2310/0297; G09G 2320/0673

See application file for complete search history.

(56) References Cited

U.S. PATENT DOCUMENTS

| | | | |
|---|---|---|---|
| 5,828,354 | A | 10/1998 | Ebihara |
| 6,317,120 | B1 | 11/2001 | Eu |
| 7,184,011 | B2 | 2/2007 | Lee et al. |
| 7,253,664 | B2 | 8/2007 | Yeh |
| 7,683,898 | B2 | 3/2010 | Park et al. |
| 7,746,312 | B2 | 6/2010 | Lee et al. |
| 7,843,447 | B2 | 11/2010 | Okuno |
| 8,248,398 | B2 | 8/2012 | Cho et al. |

(Continued)

FOREIGN PATENT DOCUMENTS

| | | | |
|---|---|---|---|
| CN | 102461343 | A | 5/2012 |
| CN | 103106868 | A | 5/2013 |

(Continued)

*Primary Examiner* — Michael J Jansen, II

(74) *Attorney, Agent, or Firm* — Seed IP Law Group LLP

(57) ABSTRACT

The embodiments relate to a display device that includes an input terminal through which a feedback voltage of a high-potential driving voltage is received from a display panel. An output terminal is included through which a high reference voltage and a low reference voltage generated on the basis of the feedback voltage are output. A flexible printed circuit board (FPCB) includes at least one capacitor connected between the input terminal and the output terminal.

14 Claims, 9 Drawing Sheets

(56) References Cited

U.S. PATENT DOCUMENTS

| | | | | |
|---|---|---|---|---|
| 8,525,820 | B2 | 9/2013 | Hong et al. | |
| 8,547,370 | B2 | 10/2013 | Hong et al. | |
| 8,633,922 | B2 | 1/2014 | Kim et al. | |
| 8,896,230 | B1 | 11/2014 | Zhang | |
| 8,994,629 | B2 | 3/2015 | Kim | |
| 9,135,853 | B2 | 9/2015 | Kim et al. | |
| 9,240,138 | B2 | 1/2016 | Seo | |
| 9,454,937 | B2 | 9/2016 | Kim et al. | |
| 9,530,378 | B2 | 12/2016 | Liu | |
| 9,646,560 | B2 | 5/2017 | Kim et al. | |
| 9,870,747 | B2 | 1/2018 | Park et al. | |
| 9,871,082 | B2 | 1/2018 | Jeon | |
| 9,978,311 | B2 | 5/2018 | Hwang et al. | |
| 10,438,535 | B2 | 10/2019 | Shaeffer et al. | |
| 11,450,279 | B2 * | 9/2022 | Lee | G09G 3/3258 |
| 11,741,900 | B2 * | 8/2023 | Lee | G09G 3/3275 345/211 |
| 2004/0095342 | A1 | 5/2004 | Lee et al. | |
| 2006/0049868 | A1 | 3/2006 | Yeh | |
| 2006/0170640 | A1 | 8/2006 | Okuno | |
| 2006/0284820 | A1 | 12/2006 | Hong et al. | |
| 2007/0024555 | A1 | 2/2007 | Park et al. | |
| 2007/0120802 | A1 | 5/2007 | Lee et al. | |
| 2008/0062100 | A1 | 3/2008 | Hong et al. | |
| 2009/0278832 | A1 | 11/2009 | Cho et al. | |
| 2011/0316841 | A1 | 12/2011 | Kim et al. | |
| 2012/0187853 | A1 | 7/2012 | Kim et al. | |
| 2013/0113775 | A1 | 5/2013 | Seo | |
| 2013/0147864 | A1 | 6/2013 | Kim et al. | |
| 2013/0271507 | A1 | 10/2013 | Kim et al. | |
| 2014/0085285 | A1 | 3/2014 | Kim | |
| 2014/0198067 | A1 | 7/2014 | Jeon | |
| 2014/0339991 | A1 | 11/2014 | Zhang | |
| 2015/0228218 | A1 | 8/2015 | Shim | |
| 2015/0348492 | A1 | 12/2015 | Park et al. | |
| 2015/0356932 | A1 | 12/2015 | Kim et al. | |
| 2015/0364077 | A1 | 12/2015 | Liu | |
| 2016/0275869 | A1 | 9/2016 | Hwang et al. | |
| 2018/0082638 | A1 | 3/2018 | Shaeffer et al. | |
| 2019/0088201 | A1 | 3/2019 | Zhao et al. | |
| 2019/0088202 | A1 | 3/2019 | Zhao et al. | |
| 2019/0088231 | A1 | 3/2019 | Zhao et al. | |
| 2021/0201801 | A1 * | 7/2021 | Lee | G09G 3/3258 |
| 2022/0392406 | A1 * | 12/2022 | Lee | G09G 3/3258 |
| 2023/0360606 | A1 * | 11/2023 | Lee | G09G 3/3258 |

FOREIGN PATENT DOCUMENTS

| | | | |
|---|---|---|---|
| CN | 105280128 | A | 1/2016 |
| CN | 107591137 | A | 1/2018 |

* cited by examiner

DISPLAY DEVICE

CROSS REFERENCE TO RELATED APPLICATION

The present application is a Continuation of U.S. patent application Ser. No. 17/890,190, filed Aug. 17, 2022, which a Continuation of U.S. patent application Ser. No. 17/136,977, filed Dec. 29, 2020, which claims priority to Korean Patent Application No. 10-2019-0179738, filed Dec. 31, 2019, the entire contents of which are incorporated herein for all purposes by this reference.

BACKGROUND

Technical Field

The present disclosure relates to a display device.

Description of the Related Art

As information society has developed, various types of display devices have been developed. In recent years, various display devices, such as a liquid crystal display (LCD), a plasma display panel (PDP), and an organic light-emitting diode (OLED) display, have been used.

Among them, the organic light-emitting diode display displays an image by using an organic light-emitting device. The organic light-emitting device (hereinafter, referred to as light-emitting device) is self-luminous and does not require a separate light source, so that the thickness and the weight of the display device are reduced. In addition, the organic light-emitting diode display has high quality characteristics, such as low power consumption, high luminance, and a high response rate.

The foregoing is intended merely to aid in the understanding of the background of the present disclosure, and is not intended to mean that the present disclosure falls within the purview of the related art that is already known to those skilled in the art.

BRIEF SUMMARY

The embodiments provide a display device in which a high-potential driving voltage and a data signal that are applied to a display panel are coupled.

The embodiments provide a display device including a power supply provided with a capacitor for coupling a gamma compensation voltage and a high-potential driving voltage.

The embodiments provide a display device including a gamma generator provided with a capacitor for coupling a feedback voltage of a high-potential driving voltage and a gamma reference voltage.

According to an embodiment, there is provided a display device includes: an input terminal through which a feedback voltage of a high-potential driving voltage is received from a display panel; an output terminal through which a high reference voltage and a low reference voltage generated on the basis of the feedback voltage are output; and a flexible printed circuit board (FPCB) comprising at least one capacitor connected between the input terminal and the output terminal.

The output terminal may include a first output terminal through which the high reference voltage is output, and a second output terminal through which the low reference voltage is output, and the at least one capacitor may include a first capacitor connected between the input terminal and the first output terminal, and a second capacitor connected between the input terminal and the second output terminal.

The FPCB may include at least one voltage division circuit that divides a voltage between the high reference voltage and the low reference voltage and thus generates a gamma compensation voltage.

The high reference voltage and the low reference voltage may be coupled with the feedback voltage by the first capacitor and the second capacitor, respectively, and the gamma compensation voltage may be coupled with the high reference voltage and the low reference voltage.

The FPCB may further include: a third output terminal through which a driver driving voltage is output to the at least one voltage division circuit; a fourth output terminal through which the high-potential driving voltage is output to the display panel; and a third capacitor connected between the third output terminal and the fourth output terminal.

The at least one voltage division circuit may generate the gamma compensation voltage on the basis of the driver driving voltage.

The driver driving voltage and the high-potential driving voltage may be coupled with each other by the third capacitor.

The display device may further include: the display panel including pixels driven by the high-potential driving voltage, and being connected to the FPBC; and a data driver placed on the FPCB, and applying a data signal generated on the basis of the gamma compensation voltage to the pixels.

A phase of the data signal may be synchronized with a phase of the gamma compensation voltage, and a phase of the high-potential driving voltage and the phase of the data signal that are applied to the pixels may be synchronized with each other.

The at least one voltage division circuit may include: an adaptive voltage adjustment circuit adaptively adjusting the feedback voltage received through the input terminal and outputting an adjusted power supply voltage; a first voltage generator generating the high reference voltage from the adjusted power supply voltage and outputting the high reference voltage through the first output terminal; and a second voltage generator generating the low reference voltage from the adjusted power supply voltage and outputting the low reference voltage through the second output terminal.

The at least one voltage division circuit may further include: a first voltage division circuit dividing a voltage between the high reference voltage and the low reference voltage, and thus generating multiple voltages; a first voltage selector selecting a voltage indicated by a register setting value among the multiple voltages generated by the first voltage division circuit, and thus generating multiple reference voltages; a second voltage division circuit dividing the multiple reference voltages, and thus generating multiple voltages at different voltage levels; a multiplexer selecting, as a reference voltage, a voltage indicated by a register setting value among the multiple voltages generated by the second voltage division circuit; and a gamma voltage generator dividing the selected reference voltage and thus generating the gamma compensation voltages corresponding to all grayscales.

According to an embodiment, a display device including: a display panel provided with a plurality of pixels; a power supply applying a high-potential driving voltage to the pixels; a gamma generator receiving a feedback voltage of the high-potential driving voltage from the display panel, and generating a gamma compensation voltage on the basis of the feedback voltage; and a data driver supplying a data voltage to the pixels on the basis of the gamma compensation voltage supplied from the gamma generator, wherein the gamma generator includes: an input terminal through which the feedback voltage is received; an output terminal through which a high reference voltage and a low reference voltage generated on the basis of the feedback voltage are output; at least one voltage division circuit dividing a voltage between the high reference voltage and the low reference voltage, and thus generating the gamma compensation voltage; and at least one capacitor connected between the input terminal and the output terminal.

The output terminal may include a first output terminal through which the high reference voltage is output, and a second output terminal through which the low reference voltage is output, and the at least one capacitor may include a first capacitor connected between the input terminal and the first output terminal, and a second capacitor connected between the input terminal and the second output terminal.

The high reference voltage and the low reference voltage may be coupled with the feedback voltage by the first capacitor and the second capacitor, respectively, and the gamma compensation voltage may be coupled with the high reference voltage and the low reference voltage.

The power supply may include: a third output terminal through which a driver driving voltage is output to at least one among the data driver and the gamma generator; a fourth output terminal through which the high-potential driving voltage is output to the display panel; and a third capacitor connected between the third output terminal and the fourth output terminal.

The at least one voltage division circuit may generate the gamma compensation voltage on the basis of the driver driving voltage.

The driver driving voltage and the high-potential driving voltage may be coupled with each other by the third capacitor.

A phase of the high-potential driving voltage and a phase of the data voltage that are applied to the pixels may be synchronized with each other.

According to an embodiment, there is provided a display device including: a display panel including pixels; a data driver generating a data signal on the basis of a gamma compensation voltage, and applying the data signal to the pixels; and an FPCB connected to the display panel and the data driver, wherein the FPCB includes: a third output terminal through which a driver driving voltage is output to the data driver; at least one voltage division circuit generating the gamma compensation voltage on the basis of the driver driving voltage; a fourth output terminal through which a high-potential driving voltage is output to the pixels; and a third capacitor connected between the third output terminal and the fourth output terminal.

The driver driving voltage and the high-potential driving voltage may be coupled with each other by the third capacitor.

The display device according to the embodiments synchronizes the phase of the high-potential driving voltage and the phase of the data signal, so that it is possible to prevent a glitch in the high-potential driving voltage caused by an rapid decrease in the current applied to the panel and prevent the dip effect in the high-potential driving voltage caused by a rapid increase in the current.

The display device according to the embodiments may solve the problem of a bright line and a dark line that are caused by the occurrence of the rapid difference in phase between the high-potential driving voltage and the data signal.

The display device according to the embodiments synchronizes the phase of the high-potential driving voltage and the phase of the data signal in real time without using a separate processor, whereby a rapid-driving display device is implemented.

BRIEF DESCRIPTION OF THE SEVERAL VIEWS OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, embodiments will be described with reference to the accompanying drawings. In the specification, when an element (area, layer, part, or the like) is referred to as being "coupled to," or "combined with" another element, it may be directly coupled to/combined with the other element or an intervening element may be present therebetween. The term "and/or" includes one or more combinations that the associated elements may define.

Terms "first," "second," etc., can be used to describe various elements, but the elements are not to be construed as being limited to the terms. The terms are only used to differentiate one element from other elements. For example, the "first" element may be named the "second" element without departing from the scope of the embodiments, and the "second" element may also be similarly named the "first" element. As used herein, the singular forms "a," "an," and "the" are intended to include the plural forms as well, unless the context clearly indicates otherwise.

It is to be understood that terms such as "including," "having," etc., are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

Figure 1:
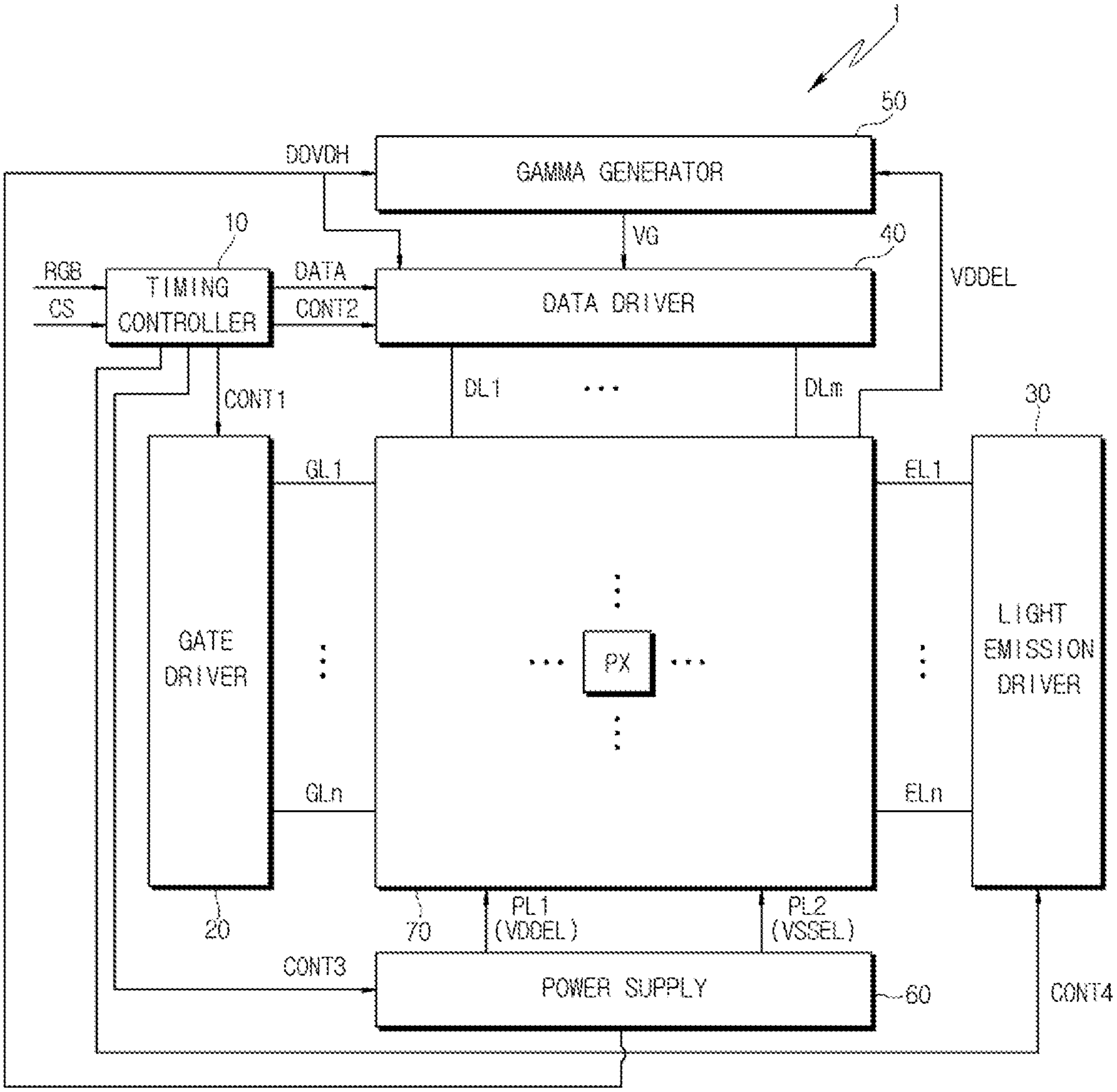
FIG. 1 is a block diagram showing a configuration of a display device according to an embodiment.

FIG. 1 is a block diagram showing a configuration of a display device according to an embodiment.

Referring to FIG. 1, a display device 1 includes a timing controller 10, a gate driver 20, a light-emission driver 30, a data driver 40, a gamma generator 50, a power supply 60, and a display panel 70.

The timing controller 10 may receive an image signal RGB and a control signal CS from outside. The image signal RGB may include multiple grayscale data. The control signal CS may include, for example, a horizontal synchronization signal, a vertical synchronization signal, and a main clock signal.

The timing controller 10 may process the image signal RGB and the control signal CS to make the signals appropriate for an operation condition of the display panel 70, so that the timing controller 10 may generate and output image data DATA, a gate driving control signal CONT1, a data driving control signal CONT2, a light-emission driving control signal CONT4, and a power supply control signal CONT3.

The gate driver 20 may be connected to pixels (or subpixels) PXs of the display panel 70 through multiple gate lines GL1 to GLn. The gate driver 20 may generate gate signals on the basis of the gate driving control signal CONT1 output from the timing controller 10. The gate driver 20 may provide the generated gate signals to the pixels PXs through the multiple gate lines GL1 to GLn.

The light-emission driver 30 may be connected to the pixels PXs of the display panel 70 through multiple light-emission lines EL1 to ELn. The light-emission driver 30 may generate light-emission signals on the basis of the light-emission driving control signal CONT4 output from the timing controller 10. The light-emission driver 30 may provide the generated light-emission signals to the pixels PXs through the multiple light-emission lines EL1 to ELn.

The data driver 40 may be connected to the pixels PXs of the display panel 70 through multiple data lines DL1 to DLm. The data driver 40 may generate data signals on the basis of the image data DATA and the data driving control signal CONT2 output from the timing controller 10. The data driver 40 may receive gamma compensation voltages VGs generated from the gamma generator 50, may select the voltage, among the gamma compensation voltages VGs, which corresponds to the grayscale of the image data DATA, and may generate data signals. The data driver 40 may provide the generated data signals to the pixels PXs through the multiple data lines DL1 to DLm.

The gamma generator 50 generates the gamma compensation voltages VGs on the basis of a driver driving voltage DDVDH generated from the power supply 60. In an embodiment, the gamma generator 50 may generate gamma compensation voltages VGs on the basis of a feedback voltage VDDEL', which is applied from the display panel 70, for a high-potential driving voltage VDDEL. The gamma generator 50 may transmit the generated gamma compensation voltages VGs to the data driver 40.

The power supply 60 may be connected to the pixels PXs of the display panel 70 through multiple power lines PL1 and PL2. The power supply 60 may generate a driving voltage to be provided to the display panel 70, on the basis of the power supply control signal CONT3. The driving voltage may include, for example, a high-potential driving voltage VDDEL and a low-potential driving voltage VSSEL. The power supply 60 may provide the generated driving voltages VDDEL and VSSEL to the pixels PXs, through the corresponding power lines PL1 and PL2.

In an embodiment, the power supply 60 may further generate the driver driving voltage DDVDH for driving the data driver 40 and the gamma generator 50. The power supply 60 may supply the generated driver driving voltage DDVDH to the data driver 40 and the gamma generator 50.

In the display panel 70, the multiple pixels PXs (or, referred to as subpixels) are arranged. The pixels PXs may be, for example, arranged in a matrix form on the display panel 70.

Each of the pixels PXs may be electrically connected to the corresponding gate line, the corresponding light-emission line, and the corresponding data line. Such pixels PXs may emit light with luminance corresponding to the gate signals, the light-emission signals, and the data signals that are supplied through the gate lines GL1 to GLn, the light-emission lines EL1 to ELn, and the data lines DL1 to DLm, respectively.

Each pixel PX may display any one among a first to a third color. In an embodiment, each pixel PX may display any one among red, green, and blue colors. In another embodiment, each pixel PX may display any one among cyan, magenta, and yellow colors. In various embodiments, the pixels PXs may be configured to display any one among four or more colors. For example, each pixel PX may display any one among red, green, blue, and white colors.

The timing controller 10, the gate driver 20, the data driver 40, and the power supply 60 may be configured as separate integrated circuits (ICs), or ICs in which at least some thereof are integrated. For example, at least one or some of the timing controller 10, the data driver 40, the gamma generator 50, and the power supply 60 may be configured as an integrated circuit. Such an integrated circuit may be implemented in the form of, for example, a flexible printed circuit board (FPCB). An embodiment in which the gamma generator 50 and the power supply 60 are implemented as an FPCB is show in FIG. 9 in detail.

In FIG. 1, the gate driver 20 and the data driver 40 are shown as elements separate from the display panel 70, but at least one among the gate driver 20 and the data driver 40 may be configured in an in-panel manner that is formed integrally with the display panel 70. For example, the gate driver 20 may be formed integrally with the display panel 70 according to a gate-in-panel (GIP) manner.

Figure 2:
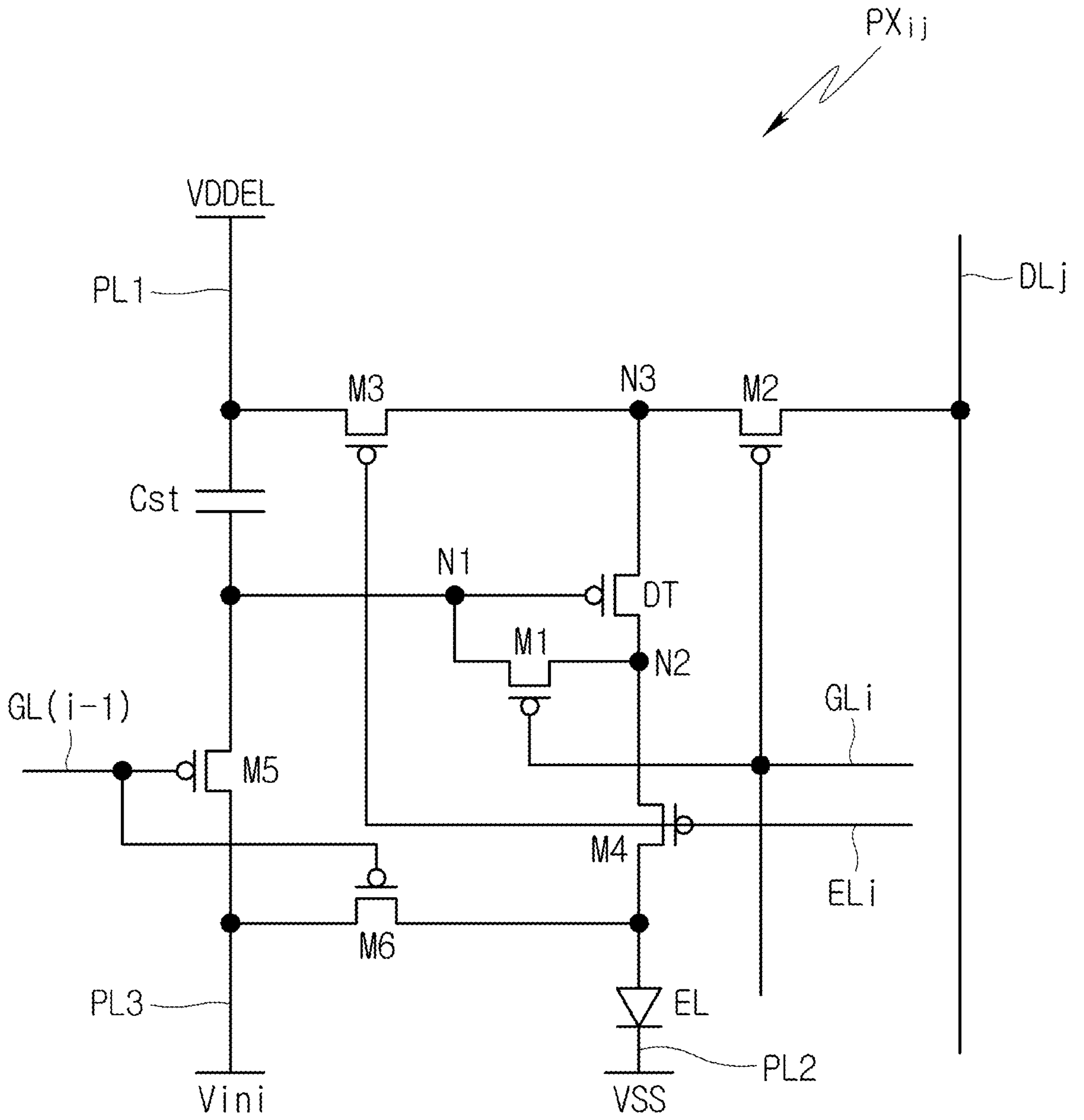
FIG. 2 is a circuit diagram showing an embodiment of the pixel shown in FIG. 1.

FIG. 2 is a circuit diagram showing an embodiment of the pixel shown in FIG. 1. FIG. 2 shows, as an example, a pixel PXij that is placed in an i-th pixel row and is connected to an i-th gate line GLi and an i-th light-emission line ELi, and is placed in a j-th pixel column and is connected to a j-th data line DLj.

Referring to FIG. 2, the pixel PXij includes a light-emitting device EL, multiple transistors M1 to M6, and DT, and a storage capacitor Cst.

A first transistor M1 is connected between a first node N1 and a second node N2. A gate electrode of the first transistor M1 is connected to the i-th gate line GLi. The first transistor M1 is turned on when a gate signal at a gate-on level is applied through the i-th gate line GLi, and connects the first node N1 and the second node N2. Herein, the first node N1 is further connected to a gate electrode of the driving transistor DT, and a first electrode of the storage capacitor Cst. The second node N2 is further connected to a drain electrode of the driving transistor DT, and a source electrode of a fourth transistor M4.

A second transistor M2 is connected between the data line DLj and a third node N3. A gate electrode of the second transistor M2 is connected to the i-th gate line GLi. The second transistor M2 is turned on when a scan signal at a gate-on level is applied through the i-th gate line GLi, and transmits the data signal applied through the data line DLj, to the third node N3. Herein, the third node N3 is further connected to a source electrode of the driving transistor DT, and a drain electrode of a third transistor M3.

The third transistor M3 is connected between the third node N3 and a first power line PL1 through which the high-potential driving voltage VDDEL is applied. A gate electrode of the third transistor M3 is connected to the i-th light-emission line ELi. The third transistor M3 is turned on when a light-emission signal at a gate-on level is applied through the i-th light-emission line ELi, and applies the high-potential driving voltage VDDEL to the third node N3.

The fourth transistor M4 is connected between the second node N2 and an anode electrode of the light-emitting device EL. A gate electrode of the fourth transistor M4 is connected to the i-th light-emission line ELi. The fourth transistor M4 is turned on when a light-emission signal at a gate-on level is applied through the i-th light-emission line ELi, and connects the second node N2 and the anode electrode of the light-emitting device EL.

A fifth transistor M5 is connected between the first node N1 and an initialization power line PL3 through which an initialization power Vini is applied. A gate electrode of the fifth transistor M5 is connected to an i-1-th gate line GL(i-1). The fifth transistor M5 is turned on when a gate signal at a gate-on level is applied through the i-1-th gate line GL(i-1), and applies the initialization power Vini to the first node N1.

A sixth transistor M6 is connected between the initialization power line PL3 through the initialization power Vini is applied, and the anode electrode of the light-emitting device EL. A gate electrode of the sixth transistor M6 is connected to the i-1-th gate line GL(i-1). The sixth transistor M6 is turned on when a gate signal at a gate-on level is applied through the i-1-th gate line GL(i-1), and applies the initialization power Vini to the anode electrode of the light-emitting device EL.

The driving transistor DT is connected between the second node N2 and the third node N3. The gate electrode of the driving transistor DT is connected to the first node N1. The driving transistor DT adjusts the amount of the current flowing to the light-emitting device EL, in response to the difference in voltage between the first node N1 and the third node N3.

The first electrode of the storage capacitor Cst is connected to the first node N1, and a second electrode of the storage capacitor Cst is connected to the first power line PL1 through which the high-potential driving voltage is applied. The storage capacitor Cst is charged with a data voltage to which compensation for the threshold voltage of the driving transistor DT is applied, and data is sampled. In the pixel PXij, the compensation for the threshold voltage of the driving transistor DT is applied to the data voltage. Thus, compensation for the variations in characteristic between the driving transistors DTs of the respective pixels (PXij) takes place, and the pixels (PXij) may be driven with the uniform characteristics.

The light-emitting device EL outputs light corresponding to a driving current. The amount of driving current flowing to the light-emitting device EL may be controlled through the driving transistor DT. In addition, the current passing to the light-emitting device EL is switched by the third and the fourth transistors M3 and M4.

The light-emitting device EL may output light corresponding to any one among red, green, and blue colors. The light-emitting device EL may be an organic light-emitting diode (OLED) or an ultra-small inorganic light-emitting diode having a size in a micro to nanoscale range, but the present disclosure is not limited thereto. Hereinafter, embodiments in which the light-emitting device EL is configured as an organic light-emitting diode (OLED) will be described.

Such a pixel PXij include an internal compensation circuit for sensing the threshold voltage of the driving transistor DT and compensating for the threshold voltage with respect to the data voltage. Being embedded in each of the pixels (PXij), the internal compensation circuit senses the threshold voltage of the driving transistor DT in each of the pixels (PXij), and compensates with respect to the data voltage in real time accordingly. However, in this embodiment, the structure of the pixels (PXij) is not limited to that shown in FIG. 2.

FIG. 2 shows the case, as an example, where the transistors M1 to M6, and DT are PMOS transistors, but the present disclosure is not limited thereto. For example, a part or all of the transistors M1 to M6, and DT constituting each pixel PXij may be configured as an NMOS transistor. In various embodiments, a part or all of the transistors M1 to M6, and DT may be implemented as a low-temperature polycrystalline silicon (LTPS) thin-film transistor, an oxide thin-film transistor, or a low-temperature polycrystalline oxide (LTPO) thin-film transistor.

Figure 3:
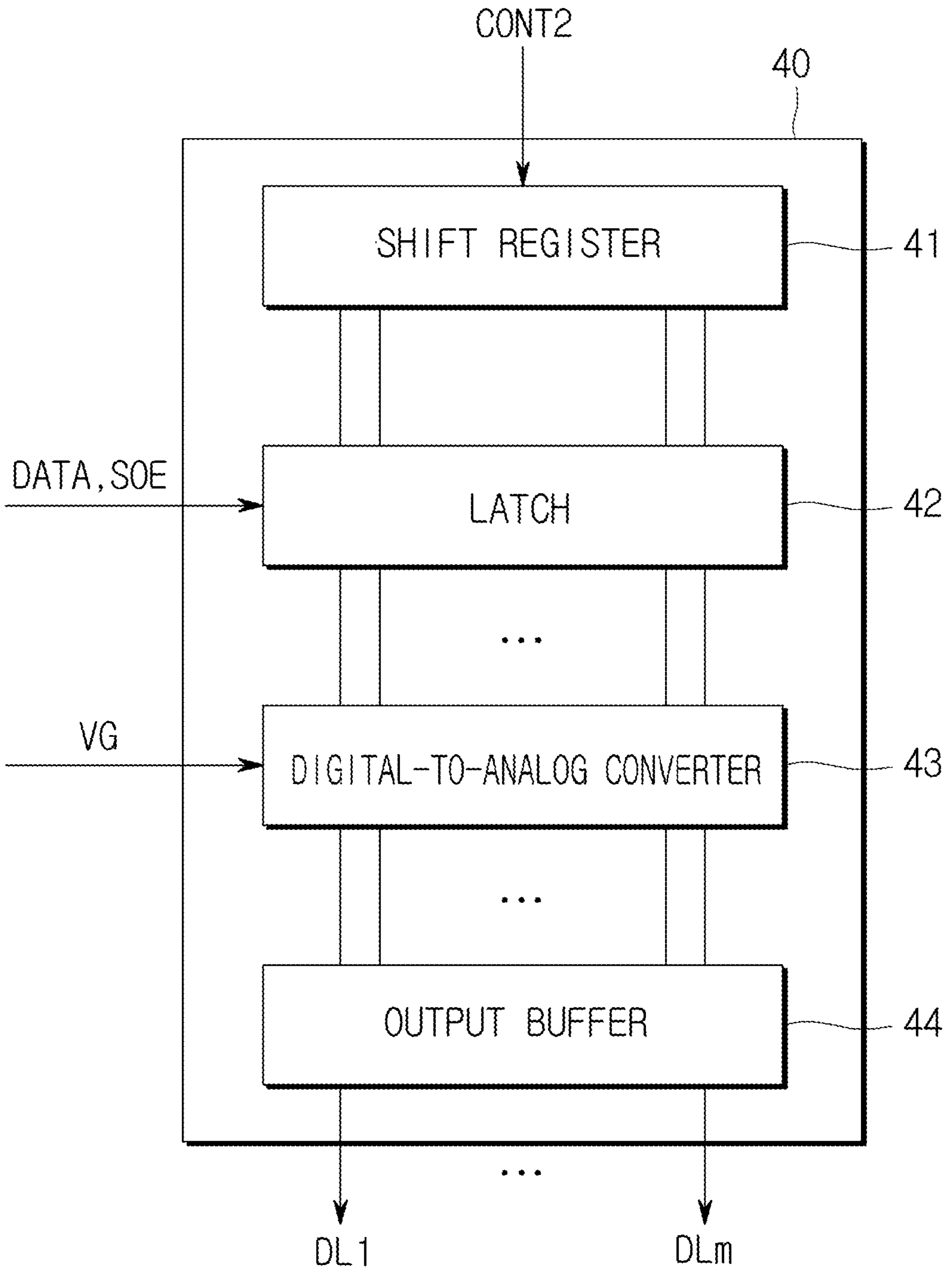
FIG. 3 is a block diagram showing a configuration of a data driver shown in FIG. 2.

FIG. 3 is a block diagram showing a configuration of the data driver shown in FIG. 2.

Referring to FIG. 3, the data driver 40 may include a shift register 41, a latch 42, a digital-to-analog converter 43, and an output buffer 44.

The shift register 41 generates a sampling signal by using the data driving control signal CONT2 received from the timing controller 10. For example, the shift register 41 may generate a sampling signal from a source start pulse and a source sampling clock signal included in the data driving control signal CONT2, and may generate a carry signal from the source start pulse.

The latch 42 sequentially samples digital image data DATA received from the timing controller 10 in response to the sampling signal. The latch 42 stores the sampled data, and outputs the sampled data all at once to the digital-to-analog converter 43 in response to a source output enable signal SOE received from the timing controller 10.

The digital-to-analog converter 43 receives a gamma compensation voltage VG from the gamma generator 50, converts the sampled data output from the latch 42 according to the gamma compensation voltage VG, and outputs the resulting data. Herein, the gamma compensation voltage VG may include analog data voltages that correspond to grayscales of the digital image signal RGB, respectively.

The output buffer 44 outputs the data voltages input from the digital-to-analog converter 43, to the data lines DL1 to DLm of the display panel 70, by using a voltage follower implemented as an operational amplifier (OP-AMP).

Figure 4:
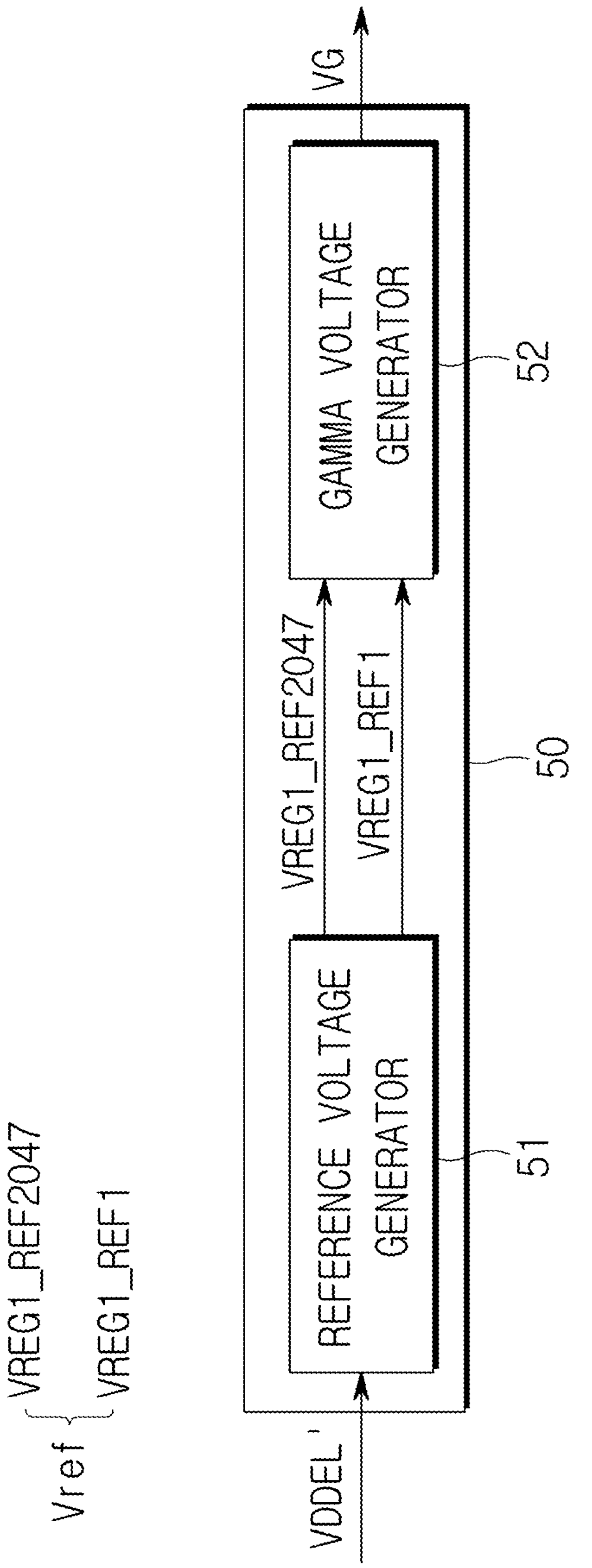
FIG. 4 is a diagram showing a configuration of a gamma generator shown in FIG. 2.

FIG. 4 is a diagram showing a configuration of the gamma generator shown in FIG. 2.

The gamma generator 50 may receive the feedback voltage VDDEL' for the high-potential driving voltage VDDEL applied to the display panel 70, and may generate a gamma compensation voltage VG for grayscale voltage compensation, on the basis of the received feedback voltage VDDEL'.

Referring to FIG. 4, the gamma generator 50 may include a reference voltage generator 51, and a gamma voltage generator 52.

The gamma generator 50 receives, from the display panel 70, the feedback voltage VDDEL' for the high-potential driving voltage VDDEL applied to the display panel 70. The gamma generator 50 generates, on the basis of the received feedback voltage VDDEL', a gamma reference voltage Vref for generating a gamma compensation voltage VG. The gamma reference voltage Vref may include, for example, a high reference voltage VREG1_REF2047 and a low reference voltage VREG1_REF1.

The gamma voltage generator 52 may generate a gamma compensation voltage VG from the gamma reference voltage Vref output from the reference voltage generator 51. For example, the gamma voltage generator 52 may generate multiple voltages by dividing a voltage between the high reference voltage VREG1_REF2047 and the low reference voltage VREG1_REF1, may select, among the generated voltages, a voltage indicated by a register setting value, and may thus generate gamma compensation voltages VGs corresponding to all the grayscales, respectively.

Hereinafter, the detailed configuration of the gamma generator 50 will be described.

Figure 5:
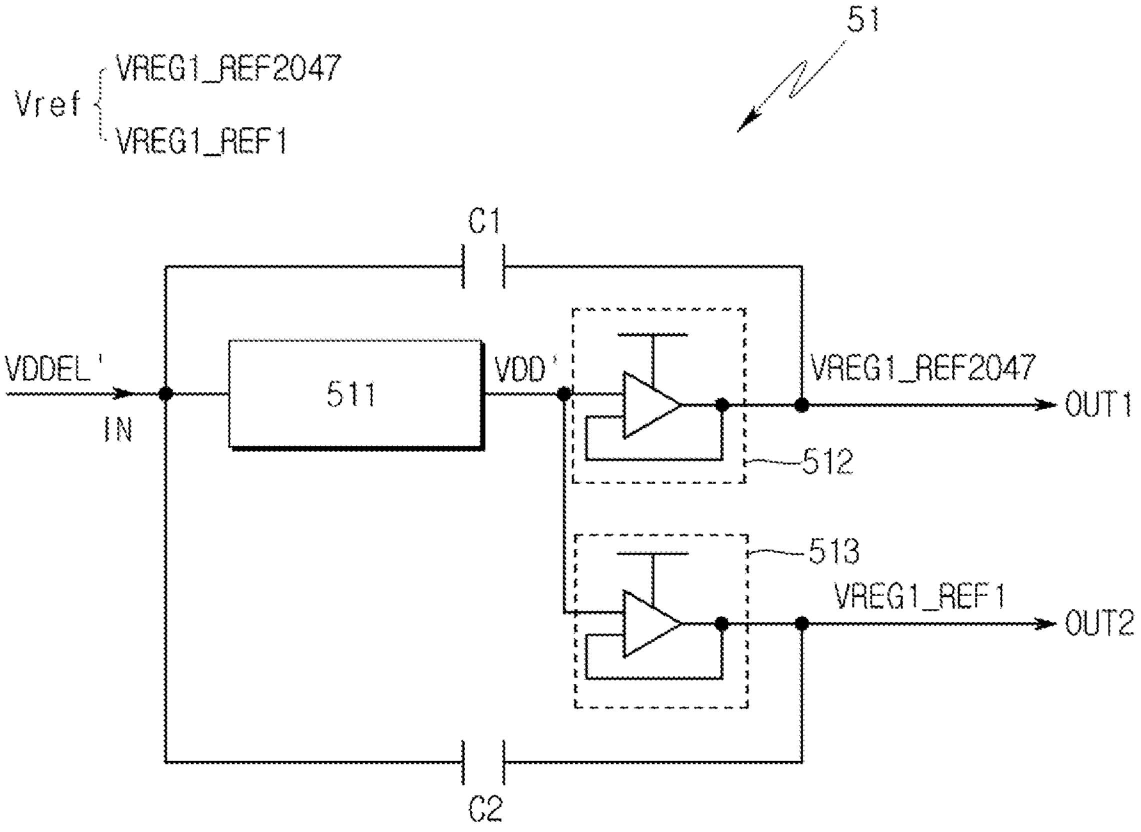
FIG. 5 is a diagram showing a configuration of a reference voltage generator shown in FIG. 4.
Figure 6:
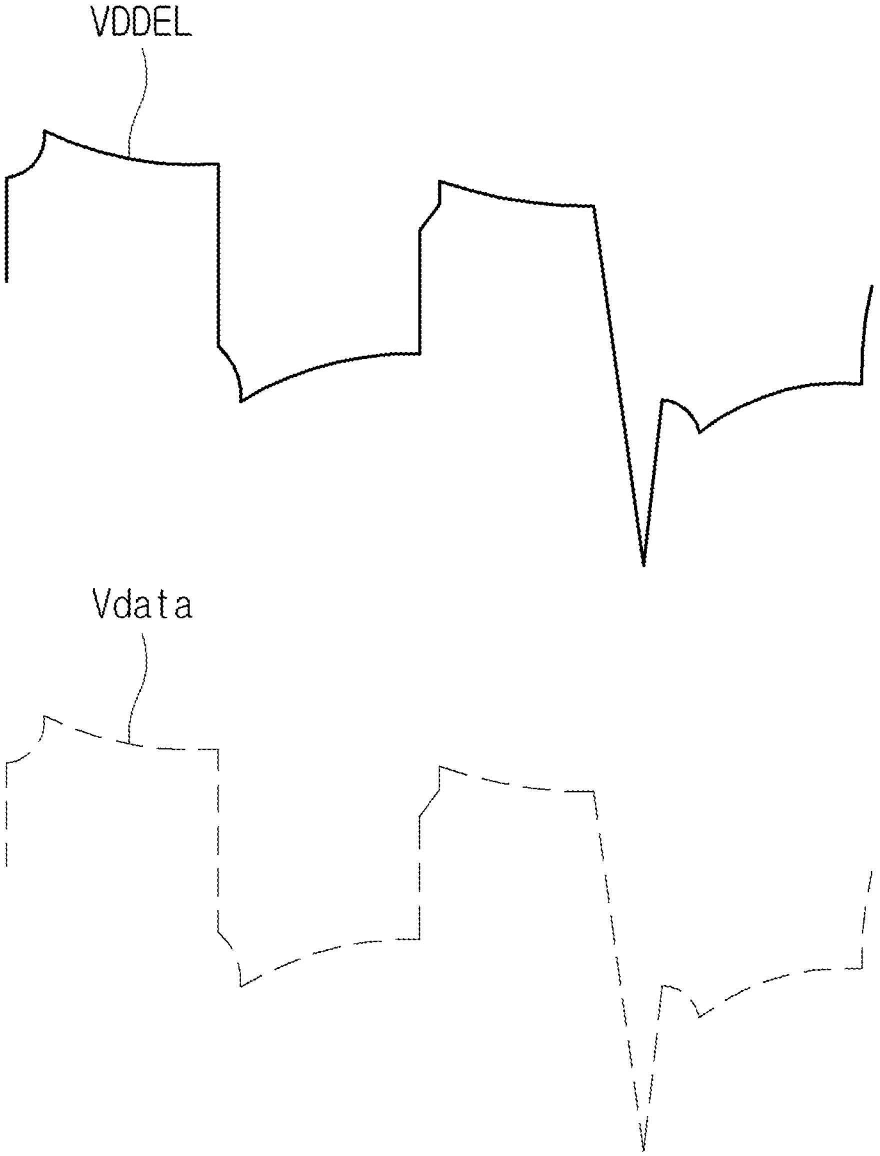
FIG. 6 is a diagram showing the waveform of a high-potential driving voltage and a data signal that are applied to a display panel.

FIG. 5 is a diagram showing a configuration of the reference voltage generator shown in FIG. 4. FIG. 6 is a diagram showing the waveform of a common voltage and a data signal of a liquid crystal display according to embodiments of the present disclosure.

Referring to FIG. 5, an adaptive voltage adjustment circuit 511 of the reference voltage generator 51 receives, from the display panel 70, the feedback voltage VDDEL' for the high-potential driving voltage VDDEL applied to the display panel 70. The adaptive voltage adjustment circuit 511 may output an adjusted power supply voltage VDD' on the basis of the feedback voltage VDDEL'.

A first voltage generator 512 receives the adjusted power supply voltage VDD' and generates the high reference voltage VREG1_REF2047. A second voltage generator 513 receives the adjusted power supply voltage VDD' and generates the low reference voltage VREG1_REF1.

In this embodiment, an input terminal IN receives the feedback voltage VDDEL', and output terminals OUT1 and OUT2 output the high reference voltage VREG1_REF2047 and the low reference voltage VREG1_REF1, respectively. A capacitor C1 may be connected between the input terminal IN and the output terminal OUT1, and a capacitor C2 may be connected between the input terminal IN and the output terminal OUT2. In an embodiment, capacitance values of a first and a second capacitor C1 and C2 may be about 1 uF, but the embodiment is not limited thereto.

The feedback voltage VDDEL' input to the reference voltage generator 51 may include a ripple component of the high-potential driving voltage VDDEL introduced into the display panel 70. In general, a capacitor has a characteristic of passing an AC component of a signal. Therefore, when the capacitors C1 and C2 are connected between the input terminal IN and the output terminal OUT1, and between the input terminal IN and the output terminal OUT2, respectively, the ripple component of the feedback voltage VDDEL' is introduced to the gamma reference voltage Vref. That is, the ripple component (phase) of the feedback voltage VDDEL' and that of the gamma reference voltage Vref may be synchronized. Since the feedback voltage VDDEL' include the ripple component of the high-potential driving voltage VDDEL introduced to the display panel 70, the ripple component of the high-potential driving voltage VDDEL introduced to the display panel 70 and that of the gamma reference voltage Vref may be synchronized with each other, consequently.

As described later, gamma compensation voltages VGs are generated by dividing the gamma reference voltage Vref provided from the reference voltage generator 51, and a data signal applied to the display panel 70 is generated on the basis of the gamma compensation voltages VGs. Therefore, when the ripple component of the high-potential driving voltage VDDEL and the ripple component of the gamma reference voltage Vref are synchronized with each other, the phase of the data voltage Vdata applied to the display panel 70 and the phase of the high-potential driving voltage VDDEL may be synchronized as shown in FIG. 6.

When the data voltage Vdata is applied to the display panel 70, the high-potential driving voltage VDDEL is influenced by the phase of the data voltage Vdata. When the data voltage Vdata is slowly changed, the influence on the high-potential driving voltage VDDEL does not affect the display performance. However, when the data voltage Vdata is rapidly changed, the change in the phase of the data voltage Vdata causes the ripple component of the high-potential driving voltage VDDEL.

When the high-potential driving voltage VDDEL has an abnormal peak (for example, a peak in the opposite phase) due to the ripple component, an unwanted voltage is applied to the pixels PXs of the display panel 70 and a bright line or dark line may be viewed.

In this embodiment, the data voltage Vdata has the phase synchronized with the ripple component of the high-potential driving voltage VDDEL. Thus, even if an abnormal phase variation occurs in the high-potential driving voltage VDDEL, the voltage value of the data voltage Vdata is changed according to the phase and thus an abnormal voltage is not applied to the pixels PXs.

As described above, in this embodiment, the difference in phase between the data voltage Vdata and the high-potential driving voltage VDDEL is minimized or reduced, so that a bright line and a dark line may be prevented from occurring on the display panel 70.

Figure 7:
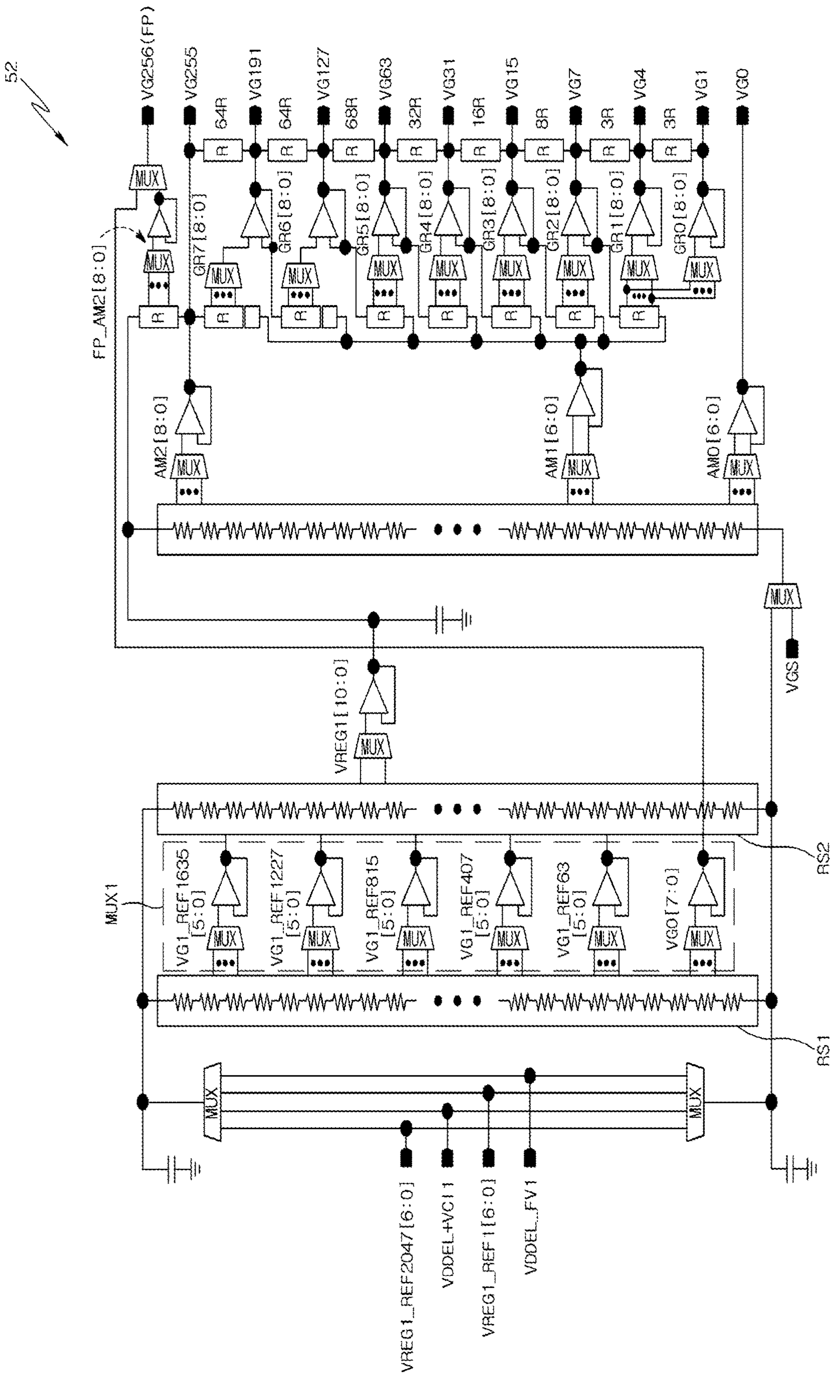
FIG. 7 is a diagram showing a configuration of a gamma voltage generator shown in FIG. 4.

FIG. 7 is a diagram showing a configuration of the gamma voltage generator 52 shown in FIG. 4.

Referring to FIG. 7, the gamma voltage generator 52 receives the gamma reference voltage Vref from the reference voltage generator 51. Specifically, the gamma voltage generator 52 receives the high reference voltage VREG1_REF2047 and the low reference voltage VREG1_REF1. In an embodiment, the gamma voltage generator 52 may further receive a feedback voltage VDDEL_FV1 (corresponding to the feedback voltage VDDEL'), which is supplied from the display panel 70, for the high-potential driving voltage VDDEL, and a high-potential driving voltage VDDEL_VDI1 that is actually output from the power supply 60, and may perform correction of a required range for the high reference voltage VREG1_REF2047 and the low reference voltage VREG1_REF1.

A first voltage division circuit RS1 divides a voltage between the high reference voltage VREG1_REF2047 and the low reference voltage VREG1_REF1 and thus generates multiple voltages between the high reference voltage VREG1_REF2047 and the low reference voltage VREG_REF1. A first voltage selector MUX1 selects a voltage indicated by a register setting value among the voltages that result from the division by the first voltage division circuit RS1, and outputs a first to a sixth reference voltages VG0, VG1_REF63, VG1_REF407, VG1_REF815, VG1_REF1227, and VG1_REF1635. A second voltage division circuit RS2 divides the first to the sixth reference voltages VG0, VG1_REF63, VG1_REF407, VG1_REF815, VG1_REF1227, and VG1_REF1635, and thus generates multiple voltages at different voltage levels.

A multiplexer MUX connected to an output terminal of the second voltage division circuit RS2 selects, as a reference voltage VREG1, a value indicated by a register setting value among the voltages that result from the division by the second voltage division circuit RS2.

Through voltage division circuits to which the reference voltage VREG1 is input and voltage selectors, the gamma voltage generator 52 generates multiple voltages at different voltage levels, and generates gamma compensation voltages VG0 to VG256 of all the grayscales in accordance with a voltage indicated by a register setting value.

For example, the gamma voltage generator 52 may first divide the reference voltage VREG1 through a string of registers Rs, and may thus generate multiple voltages at different voltage levels. Herein, the gamma voltage generator 52 may divide a voltage between the reference voltage VREG1 and a gamma ground voltage VGS for limiting a range of gamma compensation voltages, and may thus generate multiple voltages. In an embodiment, the gamma ground voltage VGS may be 0 V, but the embodiment is not limited thereto.

The gamma voltage generator 52 selects voltages indicated by register setting values AM0, AM1, AM2 among the generated multiple voltage, and generates some gamma compensation voltages including a high-potential gamma compensation voltage and a low-potential gamma compensation voltage. The gamma voltage generator 52 second divides a voltage between the some gamma compensation voltages through a string of registers Rs, and thus generates multiple intermediate voltages. The gamma voltage generator 52 selects, among the generated intermediate voltages, voltages indicated by register setting values GRO to GR7, and FP_AM2, as final intermediate voltages.

The gamma voltage generator 52 third divides the selected intermediate voltages through a string of registers Rs, and may thus generate gamma compensation voltages corresponding to all the grayscales.

Figure 8:
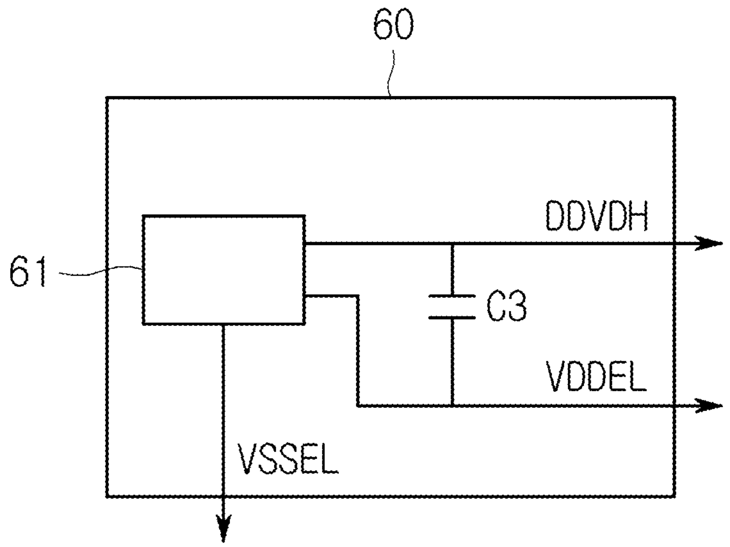
FIG. 8 is a block diagram showing a configuration of a power supply, a gamma generator, and a data driver shown in FIG. 1.

FIG. 8 is a block diagram showing a configuration of the power supply, the gamma generator, and the data driver shown in FIG. 1.

Referring to FIG. 8, the power supply 60 may generate voltages for being applied to the data driver 40, the gamma generator 50, the display panel 70, and the like. For example, the power supply 60 may generate the driver driving voltage DDVDH for driving the data driver 40 and the gamma generator 50, and may generate the high-potential driving voltage VDDEL and the low-potential driving voltage VSSEL for driving the display panel 70.

The power supply 60 may include a circuit 61 for generating voltages. The circuit may include, for example, a charge pump, a regulator, a buck converter, a boost converter, and the like.

The voltages generated from the power supply 60 may be applied to the data driver 40, the gamma generator 50, and the display panel 70. The power supply 60 may supply the driver driving voltage DDVDH to the data driver 40. In an embodiment, the driver driving voltage DDVDH may be applied to the digital-to-analog converter 43, the output buffer 44, and the like of the data driver 40. In addition, the power supply 60 may supply the driver driving voltage DDVDH to the gamma generator 50. The driver driving voltage DDVDH supplied to the data driver 40 and the gamma generator 50 may be used to generate a data signal and a gamma compensation voltage VG.

The power supply 60 may apply the high-potential driving voltage VDDEL and the low-potential driving voltage VSSEL to the pixels PXs of the display panel 70.

In this embodiment, the power supply 60 may include a third capacitor C3 connected between output lines of the driver driving voltage DDVDH and the high-potential driving voltage VDDEL. In an embodiment, a capacitance value of the third capacitor C3 may be about 10 uF, but the embodiment is not limited thereto.

By the third capacitor C3, the phase of the driver driving voltage DDVDH and the phase of the high-potential driving voltage VDDEL may be synchronized. Accordingly, the difference in phase among the data voltage, the high-potential driving voltage VDDEL, and the gamma compensation voltage VG generated on the basis of the driver driving voltage DDVDH is minimized or reduced, so that a bright line and a dark line occurring in the display panel 70 may be prevented.

Figure 9:
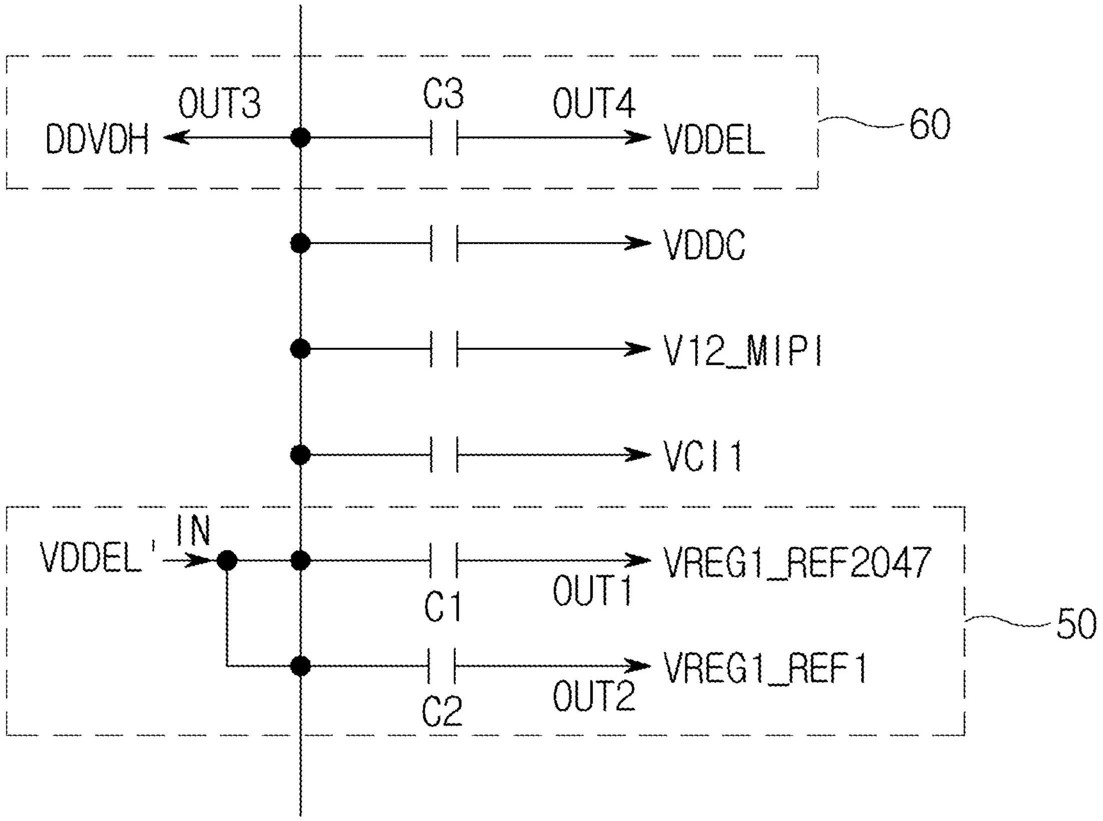
FIG. 9 is a circuit diagram showing a flexible printed circuit board (FPCB) according to an embodiment.

FIG. 9 is a circuit diagram showing a flexible printed circuit board (FPCB) according to an embodiment.

In an FPCB according to an embodiment, the gamma generator 50 and the power supply 60 are integrated.

The gamma generator 50 is provided with an input terminal IN through which the feedback voltage VDDEL' is received from the display panel 70, and with output terminals OUT1 and OUT2 through which the high reference voltage VREG1_REF2047 and the low reference voltage VREG1_REF1 are output, respectively. In this embodiment, a capacitor C1 may be connected between the input terminal IN and the output terminal OUT1, and a capacitor C2 may be connected between the input terminal IN and the output terminal OUT2. The first and the second capacitor C1 and C2 couple the feedback voltage VDDEL' and the reference voltages (Vref). In an embodiment, capacitance values of a first and a second capacitor C1 and C2 may be about 1 uF, but the embodiment is not limited thereto.

The power supply 60 is provided with a third output terminal OUT3 through which the driver driving voltage DDVDH is output, and with a fourth output terminal OUT4 through which the high-potential driving voltage VDDEL is output. In this embodiment, a third capacitor C3 may be connected between the third output terminal OUT3 and the fourth output terminal OUT4. The third capacitor C3 couples the driver driving voltage DDVDH and the high-potential driving voltage VDDEL. In an embodiment, a capacitance value of the third capacitor C3 may be about 10 uF, but the embodiment is not limited thereto.

The FPCB according to the embodiment as described above includes the capacitors C1, C2, and C3 among the high-potential driving voltage VDDEL and the voltages related to the gamma compensation voltage VG, specifically, the driver driving voltage DDVDH and the gamma reference voltage Vref, so as to couple the high-potential driving voltage VDDEL to the voltages related to the gamma compensation voltage VG. Accordingly, the difference in phase between the data voltage, which is generated from the gamma compensation voltage VG and is applied to the display panel 70, and the high-potential driving voltage VDDEL applied from the power supply 60 to the display panel 70 is minimized or reduced, so that even when the data voltage is rapidly changed, the phases of the high-potential driving voltage VDDEL and the data voltage are set to be the same, whereby image quality is improved.

It will be understood by those skilled in the art that the present disclosure can be embodied in other specific forms without changing the technical idea or essential characteristics of the present disclosure. Therefore, it should be understood that the embodiments described above are illustrative in all aspects and not restrictive. The scope of the present disclosure is characterized by the appended claims rather than the detailed description described above, and it should be construed that all alterations or modifications derived from the meaning and scope of the appended claims and the equivalents thereof fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An organic light-emitting diode display device, comprising:

a display panel including a plurality of pixels, a plurality of gate lines, a plurality of light- emission lines and a plurality of data lines, and driven by being applied with a high-potential driving voltage, a low-potential driving voltage and an initialization power;

a data driver configured to be driven by a driver driving voltage;

a gate driver applying gate signals to the plurality of pixels through the plurality of gate lines;

a light-emission driver applying light-emission signals to the plurality of pixels through the plurality of light-emission lines;

a power supply that generates the high-potential driving voltage, the low-potential driving voltage, the initialization power and the driver driving voltage;

a capacitor connected between the high-potential driving voltage and the driver driving voltage; and a gamma driver configured to be driven by the driver driving voltage, at least one voltage division circuit comprising:

an input terminal that, in operation, receives a feedback voltage of the high- potential driving voltage from the display panel;

an output terminal that, in operation, outputs the high reference voltage and the low reference voltage, each of the high reference voltage and the low reference voltage being generated based on the feedback voltage, wherein the output terminal includes:

a first output terminal, in operation, outputting the high reference voltage;

a second output terminal, in operation, outputting the low reference voltage;

a third output terminal, in operation, outputting the driver driving voltage to the data driver; and a fourth output terminal, in operation, outputting the high-potential driving voltage to the display panel; and a set of capacitors connected between the input terminal and the output terminal, wherein the second set of capacitors includes:

a first capacitor connected between the input terminal and the first output terminal; and a second capacitor connected between the input terminal and the second output terminal, wherein the first set of capacitors includes a third capacitor connected between the third output terminal and the fourth output terminal.

2. The organic light-emitting diode display device of claim 1, wherein each of the plurality of pixels includes a light-emitting device and a pixel circuit for driving the light-emitting device, and wherein the pixel circuit includes a driving transistor, a storage capacitor, and a plurality of transistors.

3. The organic light-emitting diode display device of claim 2, wherein the plurality of transistors includes:

a first transistor being connected between a first node and a second node, a gate electrode of the first transistor being connected to an i-th gate line;

a second transistor being connected between a data line and a third node, a gate electrode of the second transistor being connected to the i-th gate line;

a third transistor being connected between the third node and a first power line through which the high-potential driving voltage is applied, a gate electrode of the third transistor being connected to an i-th light-emission line;

a fourth transistor being connected between the second node and an anode electrode of the light-emitting device, a gate electrode of the fourth transistor being connected to the i-th light-emission line;

a fifth transistor being connected between the first node and an initialization power line through which the initialization power is applied, a gate electrode of the fifth transistor being connected to an i-1-th gate line; and a sixth transistor being connected between the initialization power line through which the initialization power is applied and the anode electrode of the light-emitting device, a gate electrode of the sixth transistor being connected to the i-1-th gate line.

4. The organic light-emitting diode display device of claim 3, wherein the at least one of the plurality of transistors and the driving transistor is implemented as a low-temperature polycrystalline silicon thin-film transistor, an oxide thin-film transistor, or a low- temperature polycrystalline oxide thin-film transistor.

5. The organic light-emitting diode display device of claim 3, wherein:

the at least one voltage division circuit is configured to generate a gamma compensation voltage by dividing a voltage between a high reference voltage and a low reference voltage.

6. The organic light-emitting diode display device of claim 5, wherein the at least one voltage division circuit comprises:

an adaptive voltage adjustment circuit that adaptively adjusts a feedback voltage received through an input terminal and outputs an adjusted power supply voltage;

a first voltage generator that generates the high reference voltage from the adjusted power supply voltage and outputs the high reference voltage through a first output terminal; and a second voltage generator that generates the low reference voltage from the adjusted power supply voltage and outputs the low reference voltage through a second output terminal.

7. The organic light-emitting diode display device of claim 6, wherein the the first capacitor is connected between the feedback voltage and the first output terminal.

8. The organic light-emitting diode display device of claim 7, wherein the second capacitor is connected between the feedback voltage and the second output terminal.

9. The organic light-emitting diode display device of claim 8, wherein the third capacitor is connected between the driver driving voltage and the high-potential driving voltage.

10. The organic light-emitting diode display device of claim 5, wherein the data driver includes:

a shift register that generates a sampling signal by using a data driving control signal received from a timing controller.

11. The organic light-emitting diode display device of claim 10, wherein the data driver further includes:

a latch that sequentially samples digital image data received from the timing controller in response to a sampling signal and outputs the sampled digital image data all at once in response to a source output enable signal received from the timing controller.

12. The organic light-emitting diode display device of claim 11, wherein the data driver further includes:

a digital-to-analog converter that receives the gamma compensation voltage, converts the sampled digital image data output from the latch according to the gamma compensation voltage, and outputs data resulting from the converting.

13. The organic light-emitting diode display device of claim 12, wherein the data driver further includes:

an output buffer that outputs data voltages input from the digital-to-analog converter, to the plurality of data lines of the display panel, by using a voltage follower implemented as an operational amplifier.

14. The organic light-emitting diode display device of claim 1, wherein the data driver receives gamma compensation voltages generated from the gamma driver, selects a voltage among the gamma compensation voltages which corresponds to a grayscale of an image data, generates data signals, and provides the generated data signals to the plurality of pixels through the plurality of data lines.

* * * * *